(12) United States Patent
Saito

(10) Patent No.: US 8,548,413 B2
(45) Date of Patent: Oct. 1, 2013

(54) NOISE SUPPRESSION APPARATUS

(75) Inventor: Yasuji Saito, Gunma (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1059 days.

(21) Appl. No.: 12/205,082

(22) Filed: Sep. 5, 2008

(65) Prior Publication Data

US 2009/0068973 A1    Mar. 12, 2009

(30) Foreign Application Priority Data

Sep. 7, 2007  (JP) ................................. 2007-233256

(51) Int. Cl.
*H04B 1/10* (2006.01)

(52) U.S. Cl.
USPC ........................................... 455/308; 375/346

(58) Field of Classification Search
USPC .............. 455/296, 501, 348, 285, 283, 175.1, 455/340, 327, 330, 63.1–65, 308; 375/346, 375/349–351
See application file for complete search history.

(56) References Cited

U.S. PATENT DOCUMENTS

| | | | | |
|---|---|---|---|---|
| 4,893,316 A | * | 1/1990 | Janc et al. | 708/300 |
| 5,604,768 A | * | 2/1997 | Fulton | 375/220 |
| 5,903,853 A | * | 5/1999 | Sano | 455/570 |
| 6,587,678 B1 | * | 7/2003 | Molnar et al. | 455/323 |
| 7,733,828 B2 | * | 6/2010 | Qu et al. | 370/330 |
| 2004/0190656 A1 | * | 9/2004 | Taira | 375/346 |
| 2008/0279393 A1 | * | 11/2008 | Saito et al. | 381/94.4 |
| 2009/0010366 A1 | * | 1/2009 | Wu et al. | 375/346 |

FOREIGN PATENT DOCUMENTS

| | | |
|---|---|---|
| JP | 2004-056660 | 2/2004 |
| JP | 2007-028290 | 2/2007 |

* cited by examiner

*Primary Examiner* — Christian Hannon
(74) *Attorney, Agent, or Firm* — Robert F. Hightower (57) ABSTRACT

A noise suppression apparatus comprising: a complex signal generation unit configured to convert an intermediate frequency signal into a complex signal having a real part and an imaginary part, the intermediate frequency signal being obtained by frequency-converting a reception signal; a noise detection unit configured to detect whether or not variation in level of the complex signal is greater than a predetermined threshold value, to detect generation of noise; and a noise suppressing unit configured to suppress level of the complex signal if the variation in level is greater than the predetermined threshold value.

5 Claims, 7 Drawing Sheets

NOISE SUPPRESSION APPARATUS

CROSS-REFERENCE TO RELATED APPLICATION

This application claims the benefit of priority to Japanese Patent Application No. 2007-233256, filed Sep. 7, 2007, of which full contents are incorporated herein by reference.

BACKGROUND OF THE INVENTION

1. Field of the Invention

The present invention relates to a noise suppression apparatus.

2. Description of the Related Art

It is known that an AM radio receiving device receiving an amplitude-modulated signal of AM radio broadcasting is affected by various kinds of noise such as sudden pulse noise and stationary noise (floor noise under weak electric fields, etc.), and accordingly, there are required various kinds of countermeasures against noise according to the nature of the noise.

There is proposed, as a noise countermeasure against pulse noise, for example, a mechanism of so-called noise canceller for detecting, the pulse noise to be superimposed on a received amplitude-modulated signal with a high-pass filter or the like and removing the detected noise by linear interpolation or temporary halt of an audio signal output (refer to Japanese Patent Application Laid-Open Publication No. 2007-28290, for example).

There is also proposed, as a noise countermeasure against stationary noise, for example, a mechanism for suppressing the stationary noise by detecting the stationary noise to be superimposed on an AM detected audio signal with a high-pass filter, etc. and attenuating the audio signal itself under muting processing (processing of temporarily stopping the audio signal output or making the audio signal at a certain low level) (refer to Japanese Unexamined Patent Application Laid-Open Publication No. 2004-56660).

However, for noise including noise corresponding to neither pulse noise nor stationary noise, such as noise having frequency intermediate between that of pulse noise and that of stationary noise (hereinafter, referred to as the target noise according to an embodiment of the present invention), there is no effective conventional noise countermeasure mechanism, where both noise reduction and sound quality improvement are compatible.

When using the above-mentioned noise countermeasure against pulse noise, for example, since the target noise of an embodiment according to the present invention is shorter in frequency and longer in noise width than the pulse noise, the target noise loses component of the original audio signal more than necessary by the linear interpolation or the like, thereby causing abrupt variation in audio signal, which may lead to sound degradation such as sound fade-out or intermittent sound.

For example, in the case of using the above-mentioned noise countermeasure against stationary noise, even though the target noise of an embodiment according to the present invention has a frequency higher than that of the stationary noise, since a high-pass filter allowing such a high frequency component to pass therethrough cannot be used for the AM detected audio signal in order to maintain sound quality. Therefore, the target noise cannot exactly be detected, so that effects of noise reduction may not be obtained.

SUMMARY OF THE INVENTION

A noise suppression apparatus according to an aspect of the present invention, comprises: a complex signal generation unit configured to convert an intermediate frequency signal into a complex signal having a real part and an imaginary part, the intermediate frequency signal being obtained by frequency-converting a reception signal; a noise detection unit configured to detect whether or not variation in level of the complex signal is greater than a predetermined threshold value, to detect generation of noise; and a noise suppressing unit configured to suppress level of the complex signal if the variation in level is greater than the predetermined threshold value.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<<Configuration of a Receiving Device>>>

Figure 1:
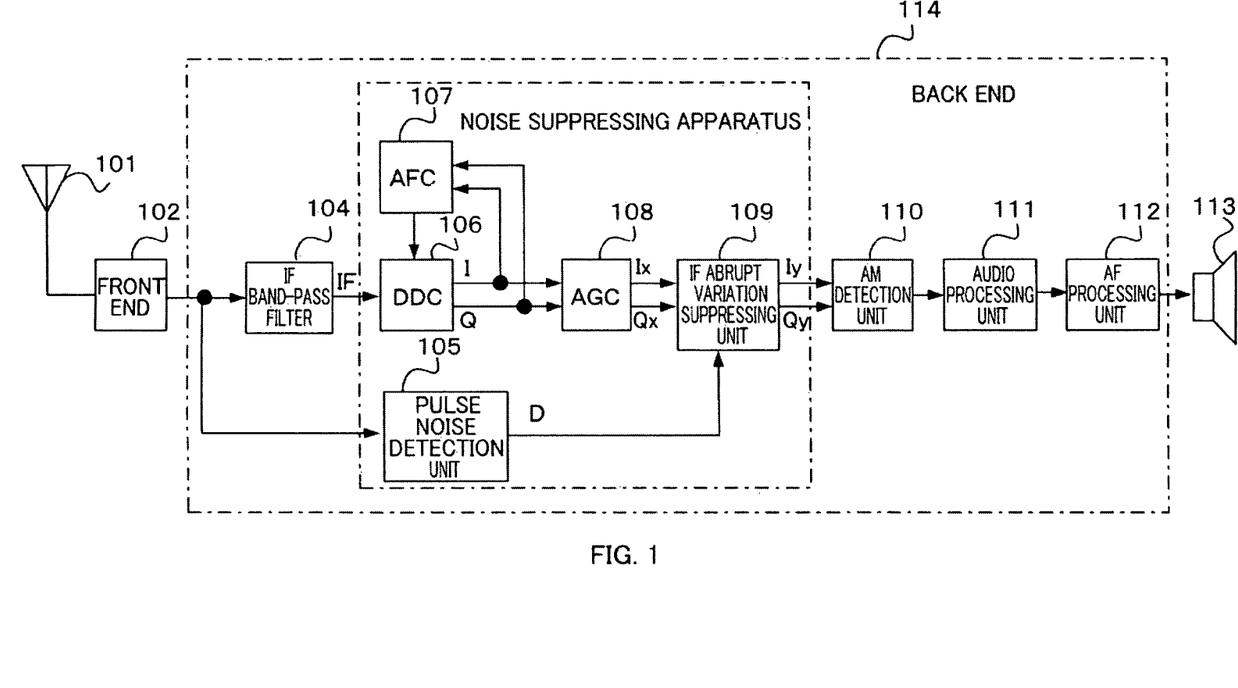
FIG. 1 is a diagram showing a configuration example of a receiving device including a noise suppression apparatus according to an embodiment of the present invention.

FIG. 1 is a diagram showing a configuration example of a receiving device including a noise suppression apparatus according to an embodiment of the present invention. The receiving device shown in FIG. 1 is a superheterodyne AM receiving device including a front end 102 and a back end 114. Each of the front end 102 and the back end 114 may be configured as an integrated circuit.

The front end 102 executes an analog front end processing for the reception signal (amplitude-modulated signal) received with an antenna 101 as an AM tuner function, and is configured as a 1-chip integrated circuit according to an embodiment of the present invention. The analog front end processing is processing of performing radio (high) frequency amplification for the reception signal having a frequency tuned to a frequency of desired wave (a desired frequency) and mixing the amplified reception signal with the local oscillation signal, that is processing before the signal having an intermediate frequency component is obtained. The intermediate frequency is a difference between the received frequency of the reception signal and the oscillation frequency of the local oscillation frequency circuit.

The back end 114 performs a digital back end processing for the digital intermediate frequency signal (hereinafter referred to as "IF signal") which is obtained by performing an A/D conversion for an output of the front end 102 by an A/D converter not shown, and is configured as a 1-chip integrated circuit using a DSP (Digital Signal Processor) in an embodiment according to the present invention.

Specifically, the back end 114 mainly includes an IF band-pass filter 104, pulse noise detection unit 105, DDG (Digital Down Converter) 106, AFC (Automatic Frequency Control) 107, AGC (Automatic Gain Control) 108, IF abrupt variation suppressing unit 109, AM detection unit 110, audio processing unit 111, and AF (Audio Frequency) processing unit 112. The pulse noise detection unit 105, DDC 106, AFC 107, AGC 108 and IF abrupt variation suppressing unit 109 make up a noise suppression apparatus according to an embodiment of the present invention.

The IF band-pass filter 104 is a band-pass filter allowing the IF signal obtained by performing the A/D conversion for the output of the front end 102, to pass therethrough with a passband width of Bw. A center frequency of the passband width Bw is the intermediate frequency of the IF signal. That is, the IF band-pass filter 104 eliminates an unnecessary frequency component from the output of the front end 102 to extract the IF signal only.

The pulse noise detection unit 105, based on the output of the front end 102, detects pulse noise N to be superimposed on the reception signal received by the antenna 101, to output the pulse noise detection signal D indicating a detection result. Specifically, pulse noise N is detected by inputting the output of the front end 102 into a high-pass filter for which the predetermined cut-off frequency for detecting the pulse noise N is set. In an embodiment according to the present invention, when the pulse noise N is detected, the pulse noise detection signal D becomes L level.

The DDC 106 is an example of a complex signal generation unit according to an embodiment according to the present invention The DDC 106 converts the IF signal output from the IF band-pass filter 104 into the complex signal having a real part and a imaginary part on a complex plane and lower the frequency of the original IF signal to a predetermined frequency. The real part of the complex signal is called the I (In-phase) signal; while the imaginary part of the complex signal is called the Q (Quadrature-phase) signal.

Figure 2:
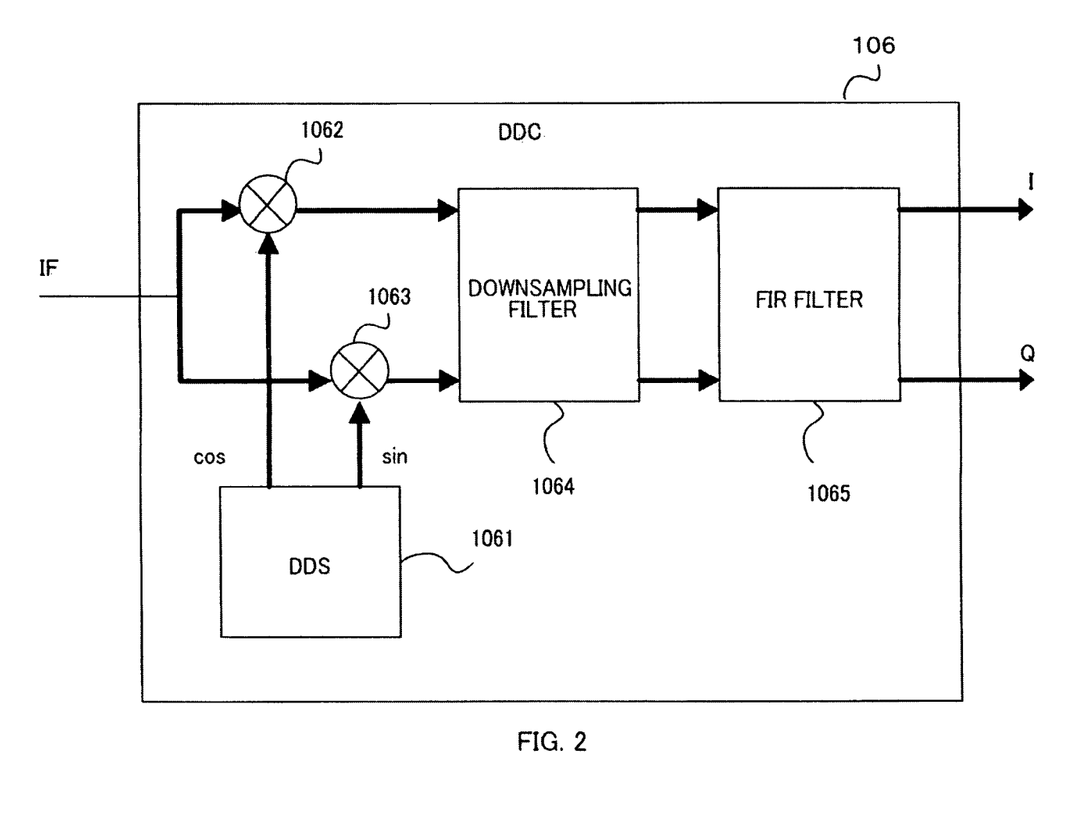
FIG. 2 is a diagram showing a configuration of a DDC of a noise suppression apparatus according to an embodiment of the present invention.

There is shown in FIG. 2 a specific configuration of the DDC 106. By mixing the IF signal output from the IF band-pass filter 104 with the sine wave signal and the cosine wave signal, which are oscillation-output from a DDS (Direct Digital Synthesizer) 1061, by mixers 1062 and 1063, respectively, frequency conversion is executed so that the IF signal has a bandwidth with a center frequency of 0 Hz on the frequency spectrum, thereby generating the I and Q signals. Then the sampling frequencies of these I and Q signals are lowered in the downsampling filter 1064 based on a thinning processing, then further thinning processing and interpolation processing are performed in the FIR filter 1065 and then the processed signals are supplied to the AGC 108.

The AFC 107 performs feedback control for adjusting the predetermined frequency of the sine and cosine signals in the DDS 1061 so that the IF signal output from the IF band-pass filter 104 is converted into the I and Q signals having a bandwidth with a center frequency of 0 Hz by the DDC 106.

The AGC 108 performs automatic gain control for limiting the amplitude of the I and Q signals output from the DDC 106 to a constant level. The I and Q signals that automatic gain control having been performed for are, hereinafter, referred to as the Ix and Qx signals, respectively.

The IF abrupt variation suppressing unit 109 detects whether or not a abrupt variation has occurred of the Ix and Qx signals output from the AGC 108, and if such a abrupt variation is detected, the IF abrupt variation suppressing unit 109 suppresses the abrupt variation. The noise causing the abrupt variation of the Ix and Qx signals are the target noise of an embodiment according to the present invention that fits into a category of neither the pulse noise nor the stationary noise.

In order to prevent a abrupt variation of the Ix and Qx signals from being erroneously detected, the IF abrupt variation suppressing unit 109 enables the suppressing of the abrupt variation of the Ix and Qx signals, that is, the target noise of an embodiment according to the present invention, only when the pulse noise detection signal D at t level is detected by the pulse noise detection unit 105. The outputs corresponding to the Ix and Qx signals in the IF abrupt variation suppressing unit 109 are hereinafter referred to as the Iy and Qy signals.

The AM detection unit 110 executes AM detection with using the Iy and Qy signals output by the IF abrupt variation suppressing unit 109 to obtain the audio signal (Amplitude demodulated signal).

The Audio processing unit 111 performs the predetermined audio processing, such as equalizer processing, for the audio signals output from the AM detection unit 110. If the pulse noise detection unit 105 detects pulse noise N, the audio processing unit 111 performs noise cancellation processing that the pulse noise N is removed by pre-interpolation, zero interpolation and linear interpolation. If there is detected stationary noise contained in the audio signal output by the AM detection unit 110, the audio processing unit 111 performs a muting processing in order to suppress the stationary noise.

The AF processing unit 112 performs the AF processing such as low frequency amplification for the demodulated signal to be output from the AM detection unit 110 and then performs reproduction through a speaker 113.

<<<Configuration/Operation of IF Abrupt Variation Suppressing Unit>>>

Figure 3:
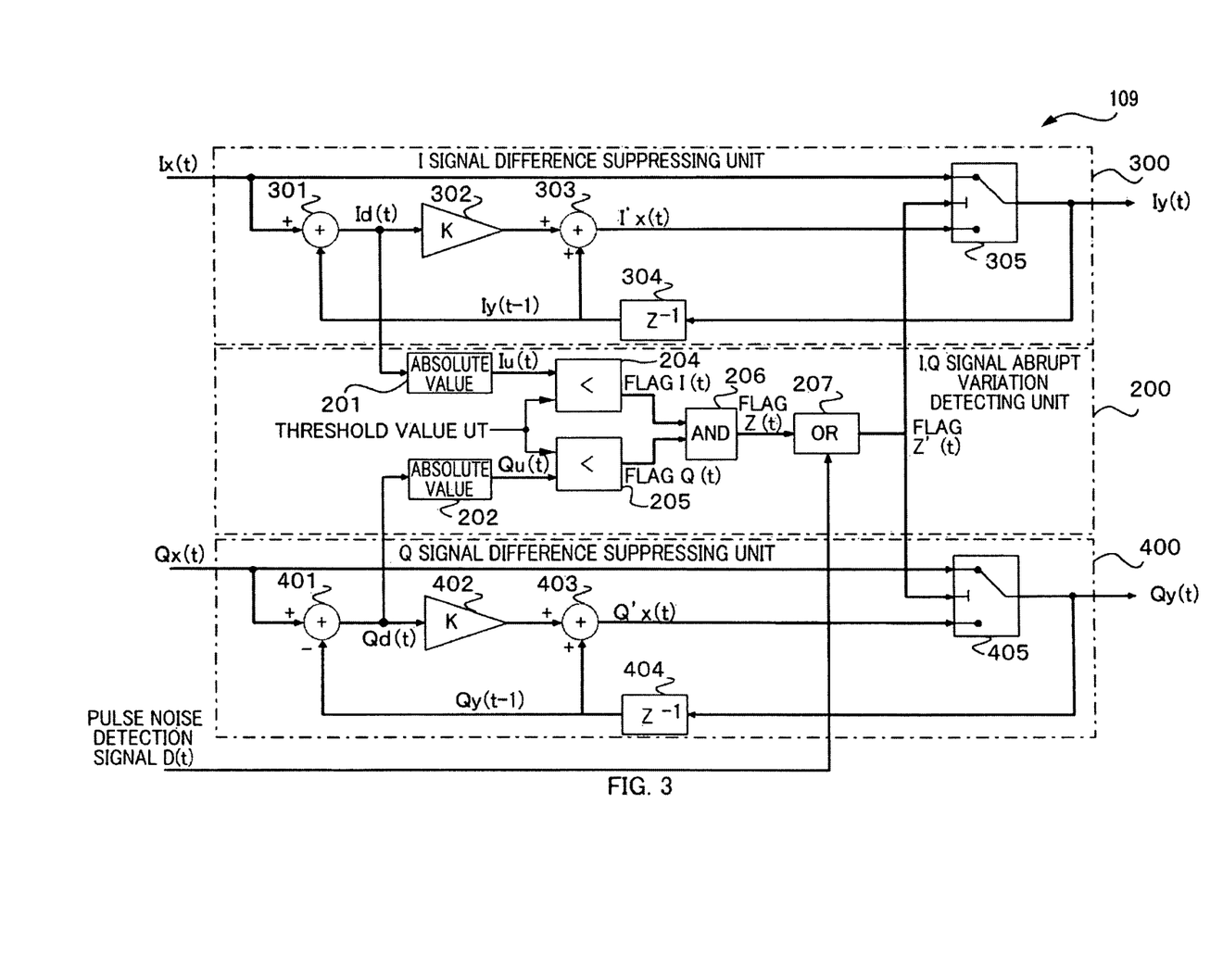
FIG. 3 is a diagram showing a configuration of an IF abrupt variation suppressing unit of a noise suppression apparatus according to an embodiment of the present invention.

FIG. 3 shows a configuration of the IF abrupt variation suppressing unit 109. In an embodiment according to the present invention, the IF abrupt variation suppressing unit 109 is implemented as S/W (software) for the DSP, however, it may be configured as H/W (hardware).

Figure 4:
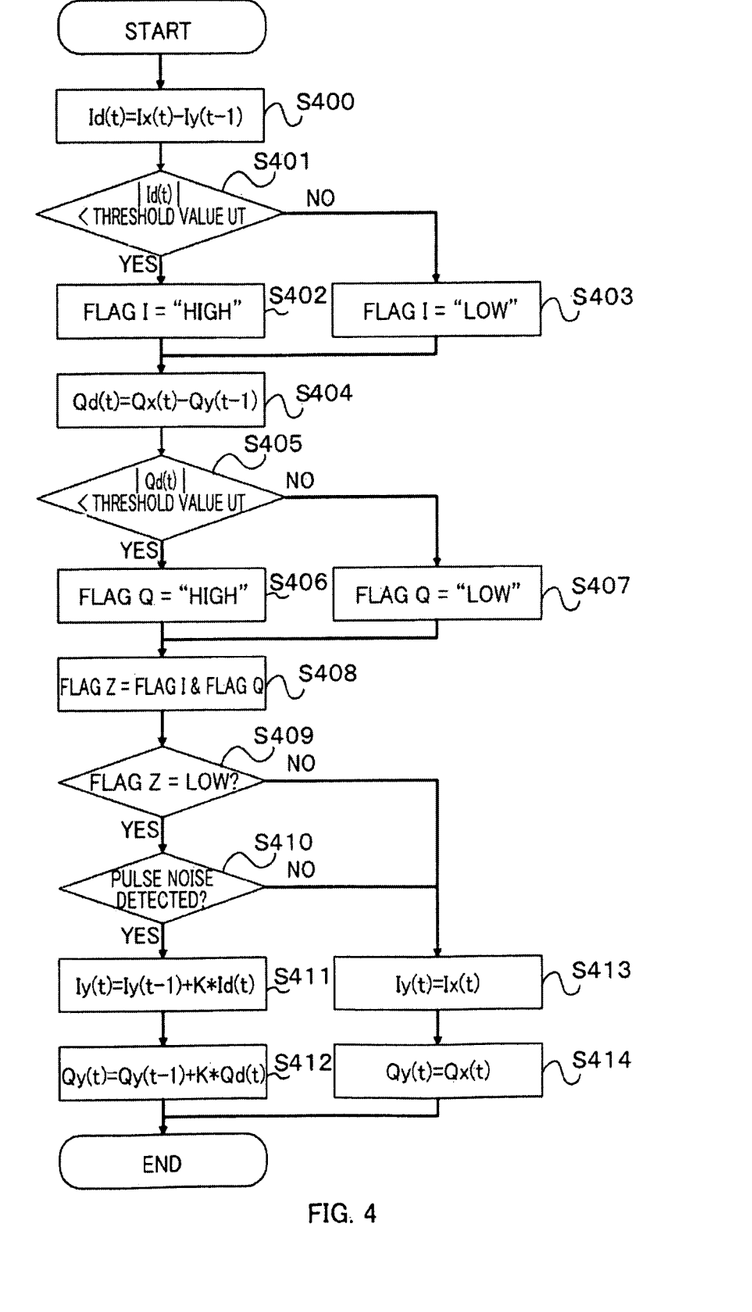
FIG. 4 is a flow chart showing a processing flow of an IF abrupt variation suppressing unit in FIG. 3.

Each of the functions of the IF abrupt variation suppressing unit 109 will hereinafter be described in detail with reference to the flow chart showing the flow of the processing of the IF abrupt variation suppressing unit 109 in FIG. 4, also to the signal waveforms shown in FIGS. 5A, 5B, 5C, 5D, 5E, 5F, 6, 7, and 8. The processing from S400 to S408 are performed by the I, Q signal abrupt variation detection unit 200; while the processing from S409 to S414 are performed by the I signal difference suppressing unit 300 and the Q signal difference suppressing unit 400.

The IF abrupt variation suppressing unit 109 includes the I, Q signal abrupt variation detection unit 200 (noise detection unit), I signal difference suppressing unit 300 (noise suppressing unit) and Q signal difference suppressing unit 400 (noise suppressing unit).

The I, Q signal abrupt variation detection unit 200 detects whether or not variation in level of the I and/or Q signal is greater than the predetermined threshold UT indicative of generation of the target noise of an embodiment according to the present invention, and determines that the target noise of an embodiment according to the present invention has been generated if the variation in level is greater than the predetermined threshold UT. specifically, it is determined that the abrupt variation of the IF signal is detected, if an absolute value Iu (t) of the differential signal Id (t) between the Ix (t) signal of present sampling time (t) and the Iy (t−1) signal of previous sampling time (t−1 output from the AGC 108 and/or an absolute value Qu (t) of the differential signal Qd (t) between the Qx (t) signal of the present sampling time (t) and the Qy (t−1) signal of the previous sampling time (t−1) the predetermined threshold value UT.

In an embodiment according to the present invention, it is assumed that the abrupt variation of the IF signal is detected if both the absolute values Iu (t) and Qu (t) of the differential signals Id (t) and the differential signals Qd (t) are greater than the predetermined threshold value UT. Therefore, it becomes possible to detect more precisely the target noise of an embodiment according to the present invention, as compared with the case where the IF signal abrupt variation is detected if either one of the absolute values Iu (t) and Qu (t) of the differential signal Id (t) and the differential signal Qd (t) is greater than the threshold value UT.

Figure 5A:
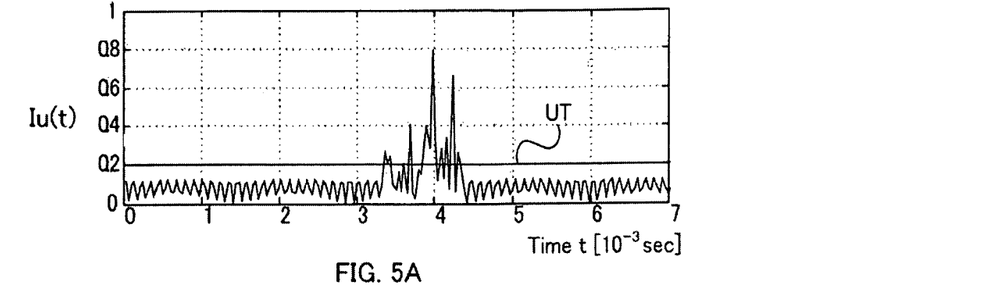
FIG. 5A is a diagram showing a waveform example of an Iu (t) signal in an IF abrupt variation suppressing unit in FIG. 3.

Specifically, the I, Q signal abrupt variation detection unit 200 executes the following processing: when a difference operation section 301 performs an operation to obtain the differential signal Id (t) between the Ix (t) signal and the Iy (t−1) signal (S400), an absolute value operation section 201 performs an operation to obtain the absolute value Iu (t) of the differential signal Id (t) and a comparison unit 204 detects whether or not the absolute value Iu (t) is greater than the threshold value UT (S402). The comparison unit 204 outputs the flag I (t) of H level if the absolute value Iu (t) is smaller than the threshold value UT (S402); while it outputs the flag of L level if the absolute value Iu (t) is above the threshold value UT (S403). That is, when the output flag I (t) is L level, it is indicated that the abrupt variation of the Ix (t) signal (the target noise of an embodiment of the present invention) has been detected. FIG. 5A shows a waveform example of an absolute value. Iu (t); while FIG. 5B shows a waveform example of a flag I (t) during an enlarged time period of a period when the absolute value Iu (t) shown in FIG. 5A is above the threshold value UT.

Similarly, the I, Q signal abrupt variation detection unit 200 executes the following processing: when the difference operation unit 401 performs an operation to obtain the differential signal Qd (t) between the Qx (t) signal and Qy (t−1) signal (S404), an absolute value operation section 202 performs an operation to obtain the absolute value Qu (t) of the differential signal Qd (t) and a comparison unit 205 detects whether or not the absolute value Qu (t) is above the threshold value UT (S405). The comparison unit 205 outputs the flag Q (t) of H level if the absolute value Qu (t) is greater than the threshold value UT (S406); while it outputs the flag of L level if the absolute value Qu (t) is above the threshold value UT (S407). That is, when the output flag Q (t) is L level, it is indicated that the abrupt variation of the Qx (t) signal is detected. FIG. 5C shows a waveform example of a flag Q (t) during the same time period as that shown in FIG. 5B.

The I, Q signal abrupt variation detection unit 200 executes the following processing. A logical AND operation unit 206 performs an operation to obtain the logical multiplication Z (t) between the flag I (t) and the Flag Q (t) (S408), and a Logical sum operation unit 207 performs an operation to obtain the logical sum Z' (t) between the logical multiplication z (t) and the pulse noise detection signal D (t). The logical sum Z' (t) of L level indicates that both the logical multiplication Z (t) and the pulse noise detection signal D (t) are at L level (S409: YES, S410: YES), the abrupt variation of the Ix (t) and Qx (t) signals are detected, and the pulse noise N is detected. The logical sum Z' (t) of H level indicates that either the logical multiplication Z (t) is at H level (S409: NO) or the pulse noise detection signal D (t) is at H level (S410: NO), and the abrupt variation of the Ix (t) signal or Qx (t) signal is not detected, or that the pulse noise N is not detected.

Figure 5B:
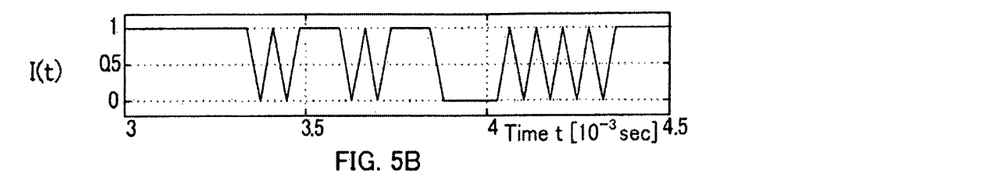
FIG. 5B is a diagram showing a waveform example of an I (t) signal in an IF abrupt variation suppressing unit in FIG. 3.
Figure 5C:
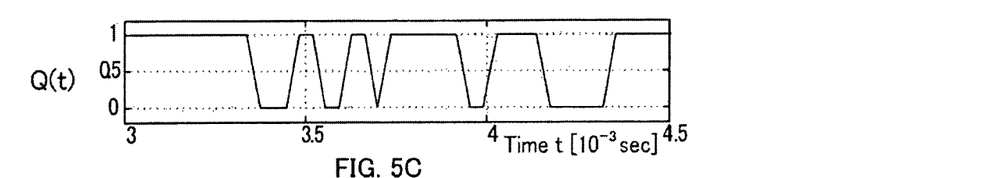
FIG. 5c is a diagram showing a waveform example of a Q (t) signal in an IF abrupt variation suppressing unit in FIG. 3.
Figure 5D:
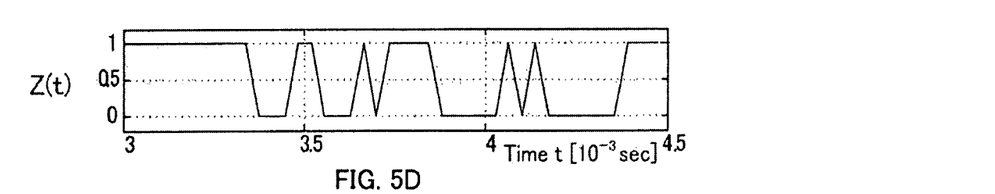
FIG. 5D is a diagram showing a waveform example of a Z (t) signal in an IF abrupt variation suppressing unit in FIG. 3.
Figure 5E:
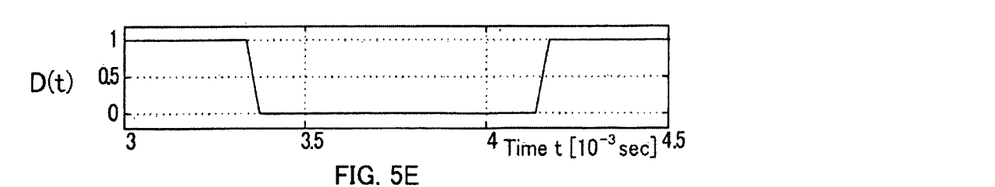
FIG. 5E is a diagram showing a waveform example of an D (t) signal in an IF abrupt variation suppressing unit in FIG. 3.
Figure 5F:
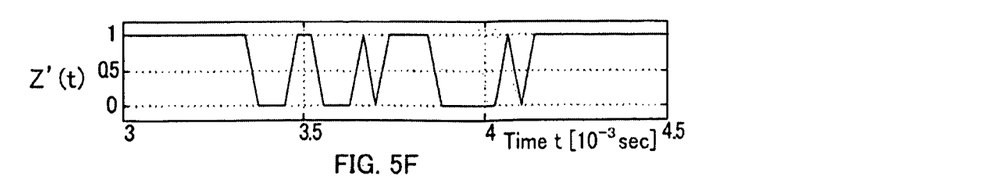
FIG. 5F is a diagram showing a waveform example of a Z' (t) signal in an IF abrupt variation suppressing unit in FIG. 3.

FIG. 5D shows a waveform example of a logical multiplication Z (t) during the same time period as that shown in FIG. 5B; FIG. 5E shows a waveform example of the pulse noise detection signal D (t) during the same time period as that shown in FIG. 5B; and FIG. 5E shows a waveform example of a logical sum Z' (t) during the same time period as that shown in FIG. 5B.

The I signal difference suppressing unit 300 selects the differential suppressing signal I' (t) obtained by suppressing the level of the Ix (t) signal or differential signal Id (t) based on the logical sum Z' (t) output from the I, Q signal abrupt variation detection unit 200, to be output as the Iy (t) signal. The differential suppressing signal I' x (t) is selected when the logical sum Z' (t) is at L level (S410: YES); while the I x (t) signal is selected when the logical sum Z, (t) is at H level (S410: NO).

Specifically, the I signal difference suppressing unit 300 executes the following processing. The difference operation unit 30 performs an operation to obtain the differential signal Id (t) between the I x (t) signal and the output Iy (t−1) of a delay unit 304 that delays the output by one sampling period, and an amplification unit 302 having a gain (0<K<1) set therefor amplifies the differential signal Id (t). An addition unit 303 then adds the Iy (t−1) signal one sampling time before the sampling time to the output of the amplification unit 302, thereby generating the differential suppressing signal I' x (t). One sampling time which is the delay time of the delay unit 304 corresponds to one sampling period of the DDC 106.

When the logical sum Z' (t) is at L level (S410: YES), the selector unit 305 selects the difference suppressing signal I' x (t) to be output as the Iy (t) signal (S411); while, when the logical sum Z' (t) is at H level (S410: NO), the selector unit 305 selects the I x (t) signal to be output as the Iy (t) signal (S413). Therefore, the difference suppressing signal I'x (t) is expressed by a following equation (1).

$$I'x(t)=K \cdot \{Ix(t)-Iy(t-1)\}+Iy(t-1) \quad (1)$$

The Q signal difference suppressing unit 400 selects the difference suppressing signal Q' x (t) obtained by suppressing the level of the Qx (t) signal or the differential signal Qd (t) based on the logical sum Z' (t) output from the I, Q signal abrupt variation detection unit 200, to be output as the Qy (t) signal. The differential signal Q' x (t) is selected when the logical sum Z' (t) is at L level (S410: YES); while the Q x (t) signal is selected when the logical OR Z' (t) is at H level (S410: NO).

Specifically, the Q signal difference suppressing unit 400 executes the following processing. The difference operation unit 401 performs an operation to obtain the differential signal Qd (t) between the Q x (t) signal and the output Qy (t−1) of a delay unit 404 that delays the output by one sampling period, and the amplification unit 402 having a predetermined gain rate K (0<K<1) set therefor amplifies the differential signal Qd (t). An addition unit 403 then adds the Qy (t−1) signal of the previous sampling time to the output of the amplification unit 402, thereby generating the differential suppressing signal Q' x (t) (S412). One sampling time which is the delay time of the delay unit 404 corresponds to one sampling period of the DDC 106.

When the logical sum Z' (t) is at L level (S410: YES), the selector unit 405 selects the difference suppressing signal Q' x (t) to be output as the Qy (t) signal (S412); while, when the logical sum Z' (t) is at H level (S410: NO), the selector unit 405 selects the Q x (t) signal to be output as the Qy (t) signal (S414). Therefore, the difference suppressing signal Q'x (t) is expressed by a following equation (2).

$$Q'x(t)=K\cdot\{Qx(t)-Qy(t-1)\}+Qy(t-1) \quad (2)$$

Figure 6:
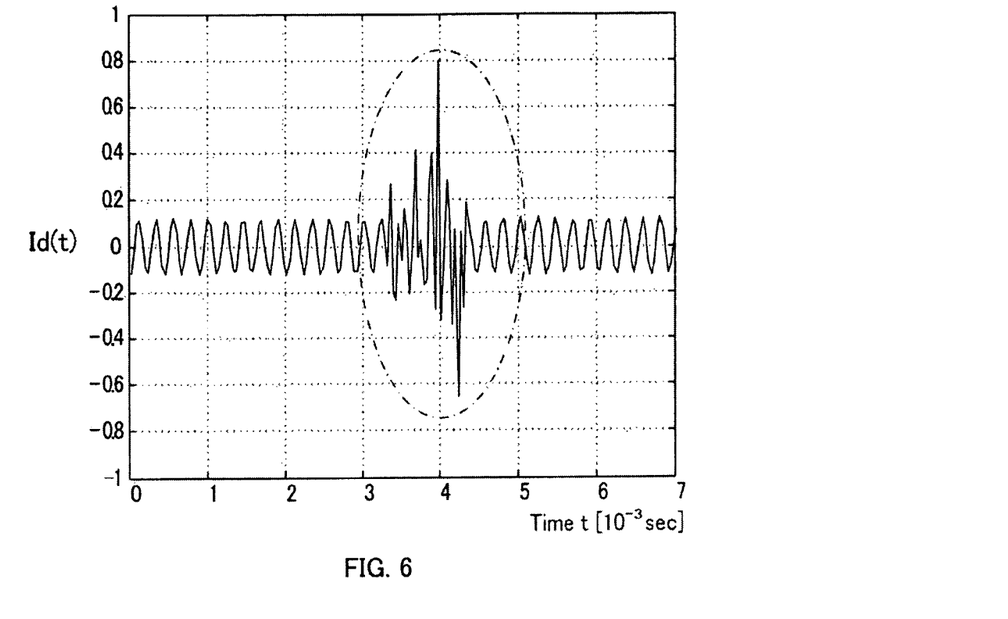
FIG. 6 is a diagram showing a waveform example of a differential signal Id (t) in an IF abrupt variation suppressing unit in FIG. 3.
Figure 7:
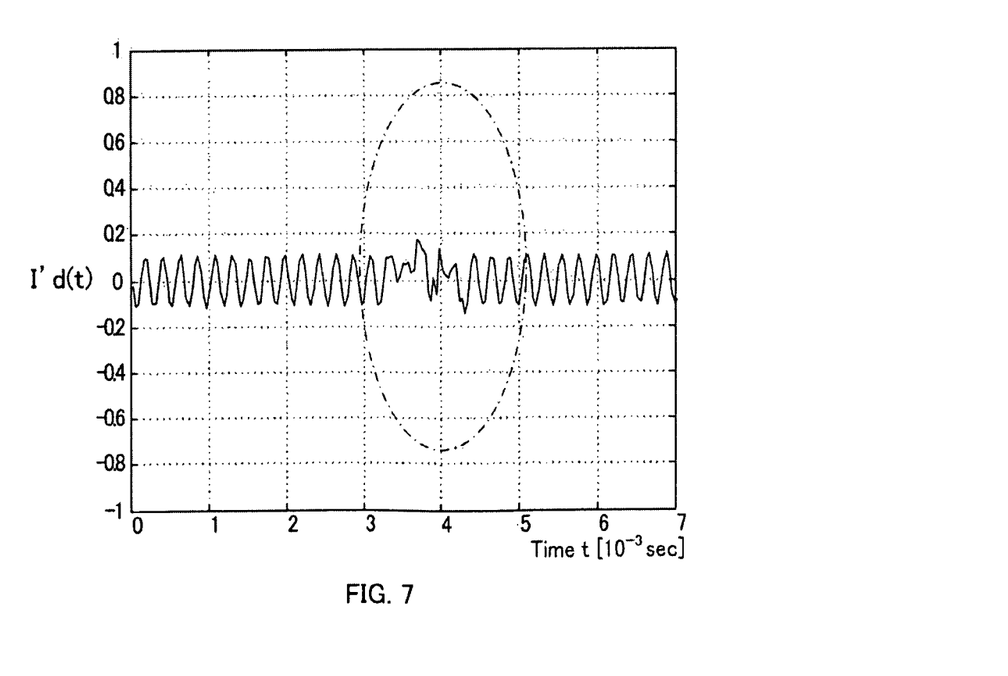
FIG. 7 is a diagram showing a waveform example of a difference suppression signal I'x (t) in the IF abrupt variation suppressing unit in FIG. 3.
Figure 8:
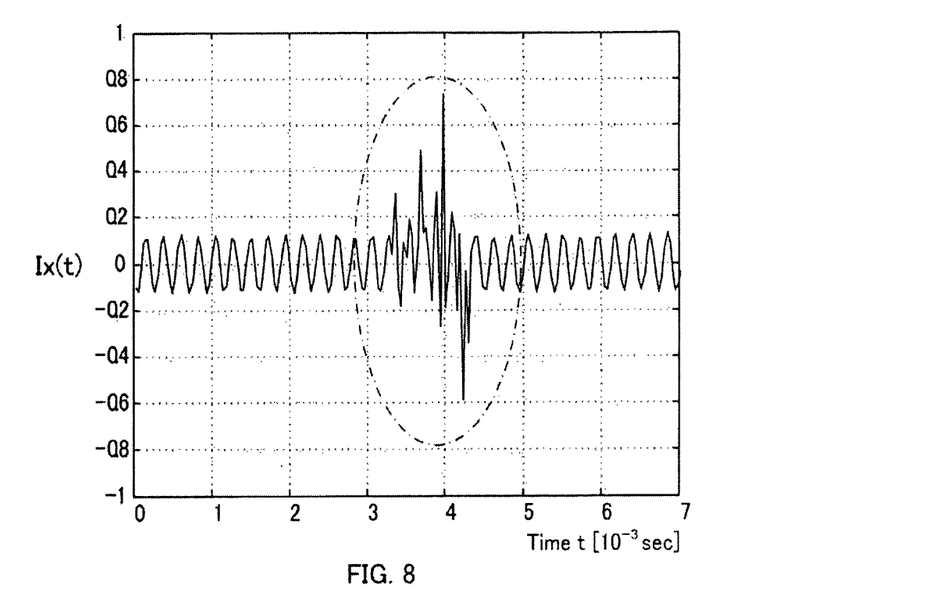
FIG. 8 is a diagram showing a waveform example of an input signal Ix (t) in an IF abrupt variation suppressing unit in FIG. 3.
Figure 9:
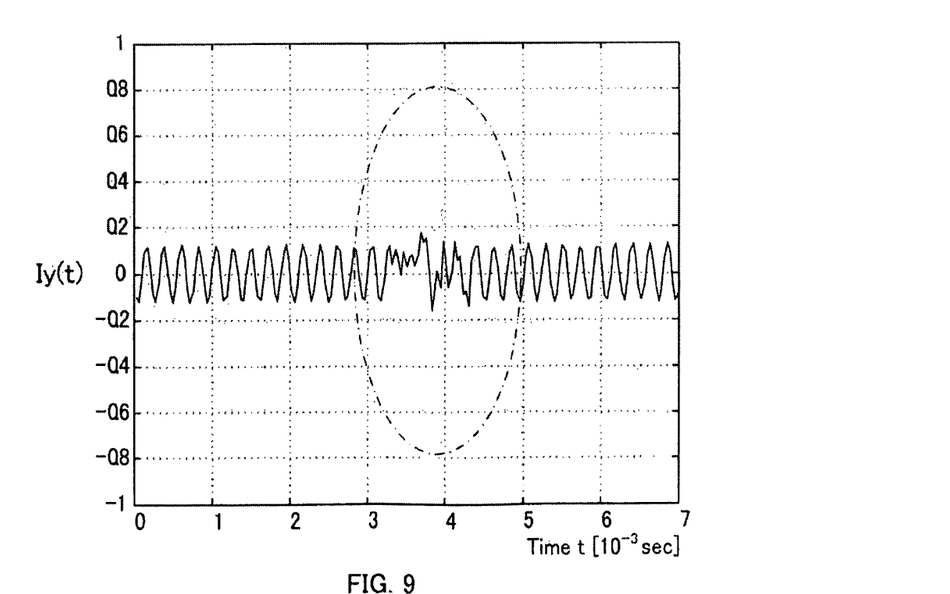
FIG. 9 is a diagram showing a waveform example of an output signal Iy (t) in an IF abrupt variation suppressing unit in FIG. 3.

FIG. 6 shows a waveform example of the differential signal Id (t), while FIG. 7 shows a waveform example of the differential suppressing signal I' x (t) corresponding to the differential signal Id (t) shown in FIG. 6. FIG. 8 shows a waveform example of the I x (t) signal, while FIG. 9 shows a waveform example of the Iy (t) signal corresponding to the Ix (t) signal shown in FIG. 8. It can be seen from FIG. 9 that degradation of sound quality can be prevented because the component of the original Ix (t) signal is not lost, and an effect of noise reduction can be obtained because the amplitude level of noise to be superimposed on the Ix (t) signal can be suppressed. The same effects can be obtained as in the case with the Qx (t) signal, while a waveform example thereof is omitted. That is, the target noise of an embodiment of the present invention can be suppressed while sound quality degradation is prevented and the effect of the noise reduction is obtained.

The above embodiments of the present invention are simply for facilitating the understanding of the present invention and are not in anyway to be construed as limiting the present invention. The present invention may variously be changed or altered without departing from its spirit and encompass equivalents thereof.

What is claimed is:

1. A noise suppression apparatus comprising:
   a complex signal generation unit configured to convert an intermediate frequency signal into a complex signal having a real part and an imaginary part, the intermediate frequency signal being obtained by frequency-converting a reception signal from an analog AM tuner;
   a noise detection unit configured to perform a difference operation to obtain difference in level between the complex signal input at the present sampling time and a signal of a noise suppressing unit output at the previous sampling time, detect whether or not variation in a level of the complex signal is greater than a predetermined threshold value, to detect generation of noise; and
   the noise suppressing unit configured to suppress the level of the complex signal if the variation in level is greater than the predetermined threshold value.

2. The noise suppression apparatus according to claim 1, wherein
   the complex signal includes an I signal representing the real part and a Q signal representing the imaginary part, and wherein
   the noise suppressing unit is further configured to suppress the level of the complex signal if variation in level of both the I signal and the Q signal is greater than the predetermined threshold value.

3. A noise suppression apparatus comprising:
   a complex signal generation unit configured to convert an intermediate frequency signal into a complex signal having a real part and an imaginary part, the intermediate frequency signal being obtained by frequency-converting a reception signal;
   a noise detection unit configured to detect whether or not variation in a level of the complex signal is greater than a predetermined threshold value, to detect generation of noise, the no detection unit including a difference operation unit configured to perform a difference operation to obtain difference in level between the complex signal input at the present sampling time and a signal of the noise suppressing unit output at the previous sampling time, an absolute value operation unit configured to perform an absolute value operation to obtain an absolute value of the difference in level, and a comparison unit configured to compare the absolute value with the threshold value to detect whether or not the absolute value is greater than the threshold value; and
   a noise suppressing unit configured to suppress the level of the complex signal if the variation in level is greater than the predetermined threshold value.

4. The noise suppression apparatus according to claim 1, wherein
   the noise suppressing unit includes:
   a difference operation unit configured to perform a difference operation to obtain difference in level between the complex signal input at the present sampling time and a signal of the noise suppressing unit output at the previous sampling time, as the variation in level;
   an amplification unit configured to amplify the difference in level at a predetermined amplification rate in a range between 0 and 1;
   an addition unit configured to add an output of the amplification unit and an output of the noise suppressing unit at the previous sampling time; and
   a selection unit configured to select either the complex signal input at the present sampling time or an output of the addition unit, based on a detection result of the noise detection unit.

5. The noise suppression apparatus according to claim 1, wherein the complex signal includes an I signal representing the real part and a Q signal representing the imaginary part, and wherein the noise suppressing unit is further configured to suppress the level of the complex signal if variation in level of only one of the I signal and the Q signal is greater than the predetermined threshold value.

* * * * *